(12) United States Patent
Puchinger et al.

(10) Patent No.: US 8,555,268 B2
(45) Date of Patent: Oct. 8, 2013

(54) AUTOMATING DYNAMIC PROGRAMS

(75) Inventors: Jakob Puchinger, Vienna (AT); Peter Stuckey, Melbourne (AU)

(73) Assignee: National ICT Australia Limited (AU)

( * ) Notice: Subject to any disclaimer, the term of this patent is extended or adjusted under 35 U.S.C. 154(b) by 767 days.

(21) Appl. No.: 12/671,466

(22) PCT Filed: Aug. 15, 2008

(86) PCT No.: PCT/AU2008/001187
§ 371 (c)(1),
(2), (4) Date: Jan. 29, 2010

(87) PCT Pub. No.: WO2009/023901
PCT Pub. Date: Feb. 26, 2009

(65) Prior Publication Data
US 2010/0205590 A1 Aug. 12, 2010

(30) Foreign Application Priority Data
Aug. 17, 2007 (AU) ................................ 2007904440

(51) Int. Cl.
*G06F 9/45* (2006.01)

(52) U.S. Cl.
USPC ......................................................... 717/153

(58) Field of Classification Search
USPC .......................................................... 717/153
See application file for complete search history.

(56) References Cited

U.S. PATENT DOCUMENTS

| | | | |
|---|---|---|---|
| 5,671,403 A | 9/1997 | Shekita et al. | |
| 6,427,234 B1 * | 7/2002 | Chambers et al. | 717/140 |
| 7,177,488 B2 | 2/2007 | Berkner et al. | |
| 7,877,738 B2 * | 1/2011 | Goldstein et al. | 717/140 |
| 2003/0125818 A1 | 7/2003 | Johnson | |

OTHER PUBLICATIONS

PCT International Search Report and Written Opinion of the International Searching Authority, Application No. PCT/AU2008/001187, Australian Patent Office, Oct. 16, 2008, 14 pages.

D.R. Smith et al., "Transformational Approach to Transportation Scheduling", Proceedings of Knowledge-Based Software Engineering Conference, Sep. 20-23, 1993, pp. 60-68.

T. Sandholm et al., "Nogood Learning for Mixed Integer Programming", School of Computer Science, Carnegie Mellon University, Pittsburgh, PA, Nov. 2006, 22 pages.

M.D. Bailey et al., "Approximate Dynamic Programming using ε-Pruning", University of Michigan College of Engineering, Electrical Engineering and Computer Science Dept., Jun. 26, 2002, 27 pages.

P. Norvig et al., "Techniques for Automatic Memoization with Applications to Context-Free Parsing", Computational Linguistics, vol. 17, No. 1, Mar. 1991, pp. 91-98.

(Continued)

*Primary Examiner* — John Chavis
(74) *Attorney, Agent, or Firm* — Snell & Wilmer L.L.P.

(57) ABSTRACT

Solving combinatorial optimisation problems using dynamic programming involves automating the integration of bounds propagation into compilation of a dynamic program. This is done by extracting bounds from partial results obtained during dynamic programming, and tightening the bounds throughout execution of the dynamic program. This dramatically reduces the number of "good" solutions that need to be constructed at each stage, improving speed and scalability of algorithms using such dynamic programming.

13 Claims, 2 Drawing Sheets

(56) References Cited

OTHER PUBLICATIONS

M. A. Trick, "A Dynamic Programming Approach for Consistency Propagation for Knapsack Constraints", Journal Annals of Operation Research, Netherlands, Issue vol. 118, Nos. 1-4, Feb. 2003, pp. 73-84.

R.L. Carraway et al., "An Improved Discrete Dynamic Programming Algorithm for Allocating Resources Among Interdependent Projects", Management Science, 37(9). 1991, pp. 1195-1200.

T.L. Morin et al., "Branch-and-Bound Strategies for Dynamic Programming" Operations Research 24(4), 1976, pp. 611-627.

* cited by examiner

AUTOMATING DYNAMIC PROGRAMS

CROSS-REFERENCE TO RELATED APPLICATIONS

The present application claims priority from Australian Provisional Patent Application No 2007904440 filed on 17 Aug. 2007, the content of which is incorporated herein by reference.

TECHNICAL FIELD

The present invention relates to dynamic programming for solving optimisation problems, and in particular relates to the integration of bounds propagation into such dynamic programming in a non-application specific manner.

BACKGROUND OF THE INVENTION

Combinatorial optimisation problems arise when allocating resources to tasks so as to maximise the benefits. Typical examples of combinatorial optimisation problems are: scheduling to meet the most possible due dates; rostering to meet personnel constraints and avoid unnecessary overtime; allocation of vehicles or machines to journeys or jobs so as to minimise cost; routing, cutting, packing and scheduling problems; many bioinformatics problems, and any combination of the above.

Dynamic programming is a powerful technique for solving optimization problems efficiently. Dynamic programming is a widely-used operational algorithm for solving classes of optimisation problems that can be divided into stages or sub-problems. This form of algorithm finds all "good" solutions to each stage, and builds on solutions of the previous stage when solving the next stage. Dynamic programming requires that the problem has the optimal substructure property, that is, one can create an optimal solution to a problem using only the optimal solutions of its sub-problems. FIG. 1 illustrates usual compilation and execution of a dynamic program. One reason that dynamic programming is popular is that dynamic programming solutions are typically easier to implement than other optimization approaches, since it simply requires functions and memoing. A dynamic program is considered herein as simply being a recursive program that is evaluated with memoization and lookup of answers. A classic example of a dynamic program is 0-1 knapsack.

A machine-readable medium includes any mechanism that provides (i.e. stores and/or transmits) information in a form readable by a machine (e.g. a computer). For example a machine-readable medium includes read only memory (ROM); random access memory (RAM); magnetic disk storage media; optical storage media; flash memory devices; electrical, optical, acoustical or other form of prompted signals (e.g. carrier waves, infrared signals, digital signals, etc.).

Example 1

Consider the 0-1 knapsack problem. Given a set of items $\{1, \ldots, n\}$ of weight $w_i$, $1 \leq i \leq n$ and profit $p_i$, $1 \leq i \leq n$, and a constraint on total weight W, choose the subset $I \subseteq \{1, \ldots, n\}$ such that $\Sigma_{i \in I} w_i \leq W$ and profit $\Sigma_{i \in I} p_i$ is maximized. The dynamic programming formulation solves knapsack problems $k(i,w)$ which allows the use of items from $\{1, \ldots, i\}$ for a total weight of w. The relationship is represented by the pseudo-code:

```
k(i,w) = if i = 0 then 0
         else if w < w_i then k(i - 1,w)
              else max(k(i - 1,w), k(i - 1,w - w_i) + p_i)
```

Note that the function k above does not return the actual set of values I required to reach the optimal solution, but it can be determined by tracing back the calculations that lead to the optimal solution. This is standard for dynamic programming and so further consideration of the actual set of values is omitted herein, with focus instead given solely to calculating the optimal solution.

Bounds propagation exploits all computational work done by the algorithm, even when computing "poor" solutions, to learn information that is later exploited on constructing promising solutions. This information is used to detect much sooner when a solution is not going to fulfil its promise, and to stop constructing this solution.

Example 2

An upper bound to the 0-1 knapsack problem is the sum of k most profitable items where they fit in the knapsack, plus the proportion of the k+1th most profitable items that fit in the remainder. If it is assumed that the items are ordered by profitability $p_i/w_i$, so $p_i/w_i \geq p_j/w_j$ for each $1 \leq i < j \leq n$ then an upper bound on each knapsack sub-problem can be defined as follows. Let $P_i = \Sigma_{j=1}^{i} p_i$ and $W_i = \Sigma_{j=1}^{i} w_i$.

$$\text{upperk}(i, w) = \begin{cases} P_i & W_i \leq w \\ P_k + p_{k+1}(w - W_k)/w_{k+1} & \exists\, 0 \leq k < i. W_k \leq w \wedge W_{k+1} > w \end{cases}$$

One approach by Morin and Marsten (Thomas L Morin and Roy E Marsten. Branch-and-bound strategies for dynamic programming. *Operations Research*, 24(4):611-627, 1976) uses bounds to improve dynamic programming, by considering a class of dynamic programs of the form maximization (or minimization) over a sum of incremental costs. Given a global lower bound L, this approach calculates the incremental costs required to reach a sub-problem, and checks whether the sum c of the incremental costs to reach the sub-problem plus the upper bound on the sub-problem at least equals the global lower bound, before solving the sub-problem. This approach applied to 0-1 knapsack gives:

```
k(i,w,c) = if c + upperk(i,w) < L then upperk(i,w)
           else if i = 0 then 0
                else if w < w_i then k(i - 1,w,c)
                     else max(k(i - 1,w,c), k(i - 1,w - w_i,c + p_i) + p_i)
```

The argument c records the profit made in the decisions taken to reach this sub-problem. It is increased when adding item i in the second argument of the max.

This approach has been extended to take advantage of lower bounds to improve the global lower bound. For example, if it is found that c+lowerk (i, w)>L, where lowerk (i,w) is a lower bound on the knapsack sub-problem then we can update L to be c+lowerk (i, w). These approaches are only usable on dynamic programs defined as maximization (or minimization) over some associative commutative operator.

The effect of bounding for dynamic programming has been shown on difficult optimisation benchmarks to reduce the number of partial solutions explored by orders of magnitude such that the algorithm might explore millions of solutions instead of billions of solutions. However, work on bounds propagation to date has been concerned with specialised bounding techniques for specific applications, which do not translate to other applications.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a method of solving a combinatorial optimisation problem using dynamic programming, the method comprising:

automating integration of bounds propagation into compilation of a dynamic program, by extracting bounds from partial results obtained during dynamic programming, and tightening the bounds throughout execution of the dynamic program.

According to a second aspect the present invention provides a computer program for compiling a dynamic program for solving a combinatorial optimisation problem, the computer program comprising:

code for automating integration of bounds propagation into compilation of a dynamic program, by extracting bounds from partial results obtained during dynamic programming, and tightening the bounds throughout execution of the dynamic program.

According to a third aspect the present invention provides a computer readable medium storing a computer program in accordance with the second aspect.

According to a fourth aspect the present invention provides a computing device operating under control of a computer program in accordance with the second aspect.

Integrating bounds propagation with dynamic programming dramatically reduces the number of "good" solutions that need to be constructed at each stage, and thereby dramatically improves the overall speed and scalability of algorithms using dynamic programming. As a result bigger problems can be solved than before, and where previously the limitations of time and space reduced the quality of solutions that could be found, the present invention greatly relaxes these limitations allowing better solutions to be found.

In preferred embodiments of the invention, local bounding is applied to give a local lower bound in calculating remaining alternatives to the dynamic program.

Additionally or alternatively, embodiments of the invention may provide ordering, in which upper bounds are used to order sub-problems based on a likelihood of finding good solutions first, to improve pruning efficacy.

Preferred embodiments of the invention may additionally or alternatively provide for argument bounding, in which lower bounds are calculated and passed to sub-problems and upper bounds are used to prune useless sub-problems. Such embodiments preferably further comprise reusing memoization for different lower bounds to avoid extending the number of calls to be made. Additionally or alternatively, such embodiments may further comprise moving bounds calculations into the start of the dynamic program function instead of the call sites to improve speed.

BRIEF DESCRIPTION OF THE DRAWINGS

An example of the invention will now be described with reference to the accompanying drawings, in which.

DESCRIPTION OF THE PREFERRED EMBODIMENTS

Figure 1:
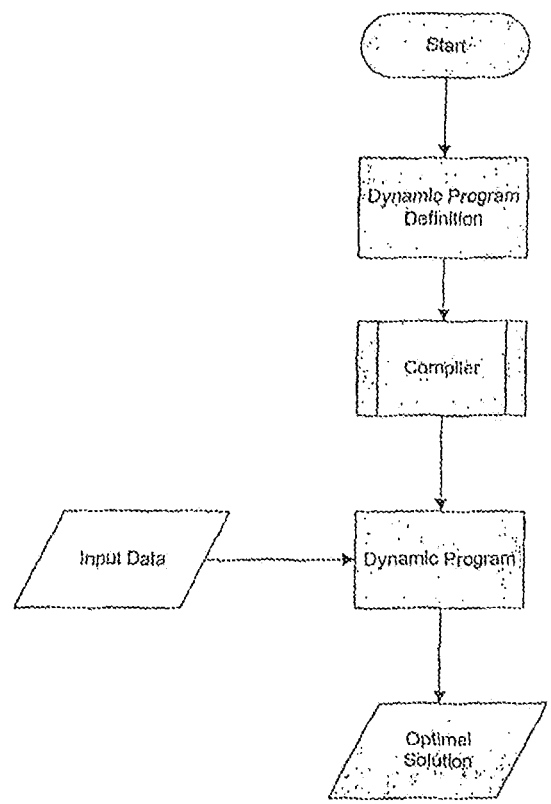
FIG. 1 illustrates compilation and execution of a dynamic program in accordance with a prior art approach.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only 10 memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 2:
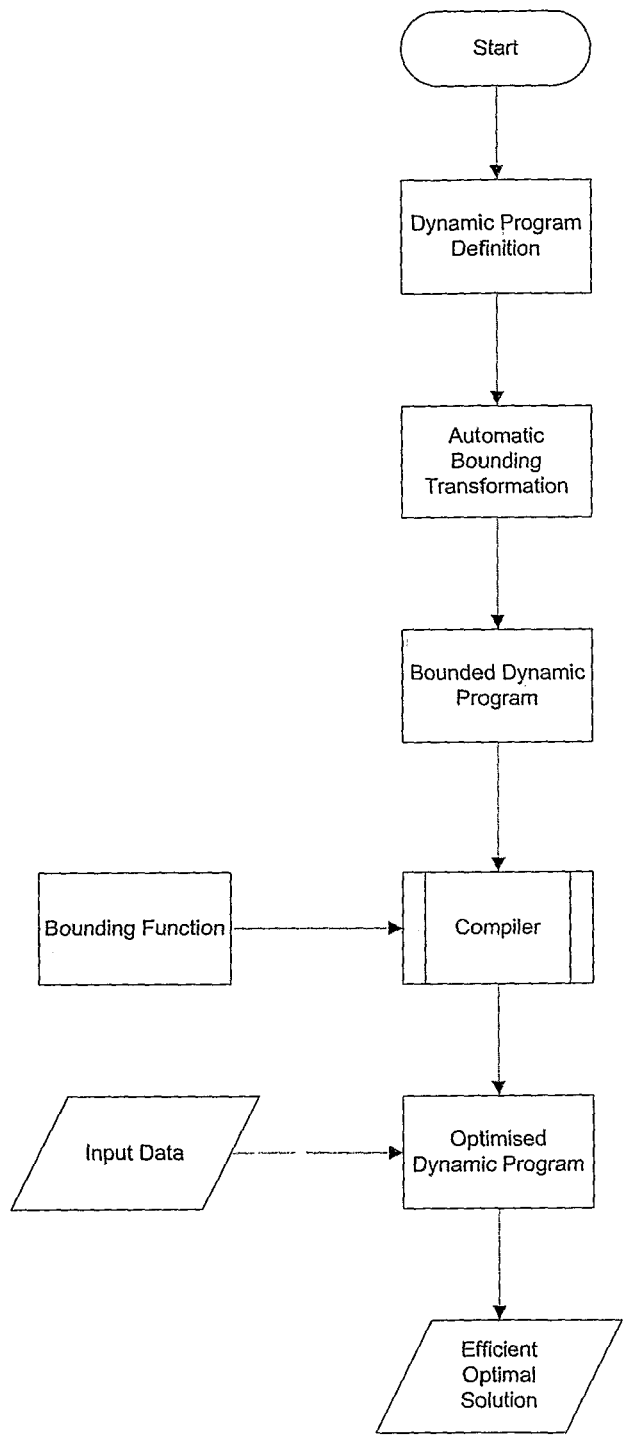
FIG. 2 illustrates compilation and execution of a dynamic program in accordance with a first embodiment of the present invention.

The present invention involves optimizing the compilation of dynamic programming functions, given a function that determines an upper bound on the result. FIG. 2 illustrates compilation and execution of a dynamic program in accordance with a first embodiment of the present invention. The present invention recognizes that such bounds can be used to improve the calculation of dynamic programs in a number of ways, including:

Local bounding where already-calculated alternatives to the dynamic program give a local lower bound in calculating the remaining alternatives;

Ordering where upper bounds are used to order the subproblems examined in an order likely to find good solutions first; and Argument bounding where lower bounds are calculated and passed to each sub-problem, and upper bounds are used to prune, or prevent execution of, the calculation of sub-problems that are useless.

The following description discusses examples of the invention which illustrate: how dynamic program functions can be automatically optimized to make use of bounds, for a wide class of function; that such optimization creates more strongly bounded versions of dynamic programs than any previous approach; and that the automatically produced code competes with hand-specialised application-specific bounded dynamic programs.

A dynamic program is most easily understood from a computer science perspective as simply a recursive function. It is assumed that a dynamic program uses the following language of expressions. $dp(\overline{o})$ is the dynamic programming function. The present invention is concerned with the part of the body of the function that appears above a call to dp since the transformations will not rely on the remaining parts. Herein, o is used to represent other parts of the expression.

$e::=o|x|dp(\overline{o})|e+e|e\times e|\text{if } o \text{ then } e \text{ else } e|\min(e,e)| \max(e,e)|\text{let } x=e \text{ in } e|$     Expressions It is assumed that x are variables and o are other expressions, which may not include dp expressions or make use of let-defined variables that (transitively) depend on dp expressions. It is further assumed that x is restricted to expressions which are non-negative, which is not a strong restriction since dynamic programs that make use of multiplication (of dp expressions) typically comply. It is also assumed for simplicity that each let expression uses a different unique variable name, however it is to be appreciated that the principles discussed herein may be applied even where this assumption is not met. It is noted that the preceding definition of the 0-1 knapsack dynamic program uses this notation.

Call-based evaluation of a dynamic program can be considered simply as evaluation of the recursive function, with the proviso that if, a recursive call is made that has previously been made then rather than re-computing the result, the previously calculated answer is retrieved. Thus the present embodiment relies on memoizing answers.

In order to make a function into a dynamic program it is necessary to memoize the results of the function calls. The following memoization functions are assumed: $getdp(\overline{o})$ returns a pair p of status of the memoization of $dp(\overline{o})$ and a value. optimal(p) is true if the optimal value is memoized, value(p) returns the value memoized, $setdp(\overline{o},x)$ memoizes the value x as the optimal value for $dp(\overline{o})$ and returns x. The memoized version of a function simply wraps the expression e of the function body by let $p=getdp(\overline{o})$ in if optimal(p) then value(p) else $setdp(\overline{o},e)$.

The following concentrates on dynamic programs for maximization problems, however it is to be appreciated that the optimization of minimization programs is analogous. It is assumed that the author of the dynamic program for $dp(\overline{o})$ also defines an upper bounding function $upperdp(\overline{o})$ such that $dp(\overline{o}) \leq upperdp(\overline{o})$.

In order to create bounded dynamic programs two types of expression are created from the definition of the dynamic program. The first expression UB(e, { }) builds an expression to evaluate the upper bound of expression e. The second argument holds the let definitions that are in scope, and is defined as:

| | |
|---|---|
| UB(o,Let) | := o |
| UB(x, {x = e} ∪Let) | := UB(e,Let) |
| UB(dp($\overline{o}$),Let) | := udp($\overline{o}$) |
| UB($e_1 + e_2$,Let) | := UB($e_1$,Let) + UB($e_2$,Let) |
| UB($e_1 \times e_2$,Let) | := UB($e_1$,Let) × UB($e_2$,Let) |
| UB(if o then $e_1$ else $e_2$,Let) | := if o then UB($e_1$,Let) else UB($e_2$,Let) |
| UB(min($e_1$, $e_2$),Let) | := min(UB($e_1$,Let),UB($e_2$,Let)) |
| UB(max($e_1$, $e_2$),Let) | := max(UB($e_1$,Let),UB($e_2$,Let)) |
| UB(let x = $e_1$ in $e_2$,Let) | := UB($e_2$,{x = e1} ∪ Let) |

The definition is straightforward, and simply replaces calls to $dp(\overline{o})$ by $udp(\overline{o})$. It is defined that $udp(\overline{o})=upperdp(\overline{o})$. The reason for having two names for the upper bound is that in a more sophisticated solution, described in the following, this definition is replaced.

The next step is to build expressions that evaluate a lower bounded version of a given expression e. The expression lbed(e, l, { }) either returns the value of e if it is greater than the given lower bound l, or returns an upper bound on the value of the expression e (which is guaranteed to be less than or equal to l). The expression is defined as:

| | |
|---|---|
| LBED(o,l,Let) | := o |
| LBED(x,l, {x = e} ∪ Let) | := LBED(e,l,Let) |
| LBED(dp($\overline{o}$),l,Let) | := lbeddp($\overline{o}$,l) |
| LBED($e_1 + e_2$,l,Let) | := let x = LBED($e_1$,l − UB($e_2$,Let),Let) in x + LBED($e_2$,l − x,Let) |
| LBED($e_1 \times e_2$,l,Let) | := let x = LBED($e_1$,l ÷ UB($e_2$,Let),Let) in x × LBED($e_2$,l ÷ x,Let) |

| | |
|---|---|
| LBED(if o then $e_1$ else $e_2$,l,Let) | := if o then LBED($e_1$,l,Let)<br>else LBED($e_2$, l,Let) |
| LBED(min($e_1$,$e_2$),l,Let) | := let x = LBED($e_1$,l,Let) in<br>if x ≤ l then x<br>else min(x, LBED($e_2$,l,Let)) |
| LBED(max($e_1$,$e_2$),l,Let) | := let x = LBED($e_1$,l,Let) in<br>max(x, LBED($e_2$, max(l,x),Let)) |
| LBED(let x = $e_i$ in $e_2$,l,Let) | := LBED($e_2$,l, {x = $e_1$} ∪ Let) |

It is assumed that any newly introduced variables x are fresh. Interesting cases arise for: dp($\bar{o}$) where a function lbeddp($\bar{o}$, l) is called which will return the lower bounded version dp($\bar{o}$) (described further in the following); for + the upper bound of the second summand is used to give a correct lower bound for evaluating the first summand, while the actual value of the first summand is used to lower bound the second summand; similarly for ×; min where if the first expression fails to surpass the lower bound, it is not necessary to look at the second expression; and for max where the first expression can improve the lower bound for the second expression.

The definition of lbeddp($\bar{o}$, l) is:
let x=udp($\bar{o}$) in if x≤l then x else dp($\bar{o}$)
which checks if the upper bound of the dp($\bar{o}$) cannot reach the required lower bound. If so it simply returns the upper bound, otherwise the sub-problem is solved.

Note that the definition of lbed above is careful to introduce let expressions for any result that is reused. This is important to avoid unnecessary repeated computation.

Theorem 1. Let C be a context assigning values to (free) variables in e. Let ⟦e'⟧C be the value of e' obtained by evaluating expression e' in context C. Suppose ⟦x⟧C=⟦$e_x$⟧C for each x=$e_x$∈ Let. Then u=⟦LBED(e, l, Let)⟧C is such that either u>l and u=⟦e⟧C or u≤l and u≥⟦e⟧C.

The preceding transformations allow introduction of local bounds transformations. For local bounds transformation, once the first part of a max expression is determined, the bounds are used to determine if the second part should be evaluated.

| | |
|---|---|
| LOCAL(o,Let) | := o |
| LOCAL(x,Let) | := x |
| LOCAL(dp($\bar{o}$),Let) | := dp($\bar{o}$) |
| LOCAL($e_1$ + $e_2$,Let) | := LOCAL($e_1$, Let) + LOCAL($e_2$,Let) |
| LOCAL($e_1$ × $e_2$,Let) | := LOCAL($e_1$, Let) × LOCAL($e_2$,Let) |
| LOCAL(if o then $e_1$ else $e_2$,Let) | := if o then LOCAL($e_1$,Let)<br>else LOCAL(e2,Let) |
| LOCAL(min($e_1$,$e_2$),Let) | := min(LOCAL($e_1$,Let),LOCAL($e_2$,Let)) |
| LOCAL(max($e_1$,$e_2$),Let) | := let x = LOCAL($e_1$,Let)in<br>max(x,LBED($e_2$,x,Let)) |
| LOCAL(let x = $e_1$ in $e_2$,Let) | := LOCAL($e_2$,{x = $e_1$} ∪ Let) |

Example 3

Consider the knapsack program defined in Example 1. The result of the local bounding transformation (omitting the memoization wrapper and after inlining the definition of lbedk(i−1,w−$w_2$, $x_1$−$p_i$)) is:

$$k(i, w) = \text{if } i = 0 \text{ then } 0$$
$$\text{else if } w < w_i \text{ then } k(i - 1,w)$$
$$\text{else let } x_1 = k(i - 1,w) \text{ in}$$
$$\max(x_1,$$
$$\text{let } x_2 = \text{let } x_3 = uk(i - 1,w - w_i) \text{ in}$$
$$\text{if } x_3 \leq x_1 - p_i \text{ then } x_3$$
$$\text{else } k(i - 1,w - w_i)$$
$$\text{in } x_2 + p_i)$$

It can be seen that if the upper bound on the second call k(i−1,w−$w_i$) is not good enough to increase the max then the recursive call will not be made. The resulting code could be improved further, for example it is possible to substitute for $x_2$ since it occurs only once. Also if $x_2$ takes the value uk(i−1, w−$w_i$) then it is guaranteed that it will not create a maximum, but improving this is more difficult and the overhead is low.

The local bounding technique ensures that before any call to dp($\bar{o}$) if there is a known lower bound, then a check is made whether the upper bound can surpass the lower bound. The number of calls to dp to solve a problem using local bounds cannot increase.

Theorem 2. The set of calls C of the form dp($\bar{o}'$) made in order to solve a given problem dp($\bar{o}$) using the local bound optimized version is a (possibly non-strict) subset of the set of calls C' used to solve dp($\bar{o}$) using the standard form.

Hence the local bounding technique is likely to be beneficial as long as the overhead of computing the udp($\bar{o}'$) is small enough.

It is assumed that after some amount of initialization (which occurs before the dynamic program is invoked), the bounds function can be determined in (amortized) constant time. However there exists the possibility that when determining udp($\bar{o}$), dp($\bar{o}$) may have already been determined. In this case, there is no point in using the inaccurate and cheap upper bound function, when the accurate answer is already memoized. Hence the present embodiment provides for memoization of dp($\bar{o}$) so that bounds can be memoized as well, as follows:

$$udp(\bar{o}) = \text{let } p = getdp(\bar{o})$$
$$\text{in if } known(p) \text{ then } bound(p)$$
$$\text{else } bsetdp(\bar{o}, upperdp(\bar{o}))$$

where the memoization functions are extended with: known (p) is true if either a bound or the optimal value is memoized, bound(p) returns the bound or optimal value recorded in p, and bsetdp($\bar{o}$, x) memoizes the value x as a bound for dp($\bar{o}$) and returns x.

The application of such bounding in the present embodiment implies that not all of the sub-problems that make up a dynamic program are necessarily going to be evaluated. Consequently, the order in which the sub-problems are evaluated can influence program efficiency. The present embodiment thus further provides for use of the bounds as an estimate of where the better solution lies, and provides for the program to try those values first. Moreover, the more quickly a good solution is found, the greater the amount of pruning that can be achieved by the bounded dynamic program. Accordingly, in the present embodiment, ordering is used in the max expressions that set up the bounds. To modify the local bounding transformation so as to also order evaluations, the present embodiment evaluates the bounds of both expressions in a max before choosing an order in which to evaluate them. The following rules are changed for the local transformation to implement ordering:

```
ORDER(max(e₁,e₂), Let) := let x₁ = UB(e₁,Let) in let x₂ = UB(e₂,Let) in
    if x₁ ≥ x₂
    then let x₃ = ORDER(e₁,Let) in
        max(x₃,LBED(e₂,x₃,Let))
    else let x₄ = ORDER(e₂,Let) in
        max(x₄,LBBD(e₁,x₄,Let))
```

Example 4

The local ordered version of knapsack, where the memoization wrapper and inlined calls to lbedk are omitted, is:

```
k(i,w) = if i = 0 then 0
    else if w < wᵢ then k(i – 1,w)
    else let x₁ = uk(i – 1,w) in
        let x₂ = uk(i – 1,w – wᵢ) + pᵢ in
    if x₁ ≥ x₂
    then let x₃ = k(i – 1,w) in
        max( x₃,
            let x₄ = let x₅ = uk(i – 1,w – w₁) in
                if x₅ ≤ x₁ – pᵢ then x₅
                else k(i – 1,w – wᵢ)
            in x₄ + pᵢ)
    else let x₆ = k(i – 1,w – wᵢ) + pᵢ in
        max( x₆,
            let x₇ = uk(i – 1,w) in
            if x₇ ≤ x₆ then x₇
            else k(i – 1,w))
```

One can begin to see why a programmer may want these transformations automated, given the relative size of this code compared to the starting code of Example 1. It is noted that this code can be improved, for example by recognizing that $x_7 = x_1$.

As defined, the ordering is only applied to a top-most min or max expression. An ordered version of lbed can be defined which also orders any sub-expressions. However, since the ordering code adds significant overhead, it is likely not desired at every level of the expression. In order to experiment effectively with ordering, the expression language is extended with ordered versions of the operations oplus (+), otimes (×), omin (min) and omax (max). The bounded expression evaluation can then be extended to handle these new expressions using ordering. The following illustrates oplus and omax:

```
LBED(oplus(e₁,e₂)l,Let) := let x₁ = UB(e₁,Let) in let x₂ = UB(e₂,Let) in
    if x₁ + x₂ ≤ l then x₁ + x₂ else
    if x₁ > x₂
    then let x₃ = LBED(e₁,l – x₂,Let) in
        x₃ + LBED(e₂,l – x₃,Let)
    else let x₄ = LBED(e₂,l – x₁,Let) in
        x₄ + LBED(e₂,l – x₄,Let)
LBED(omax(e₁,e₂),Let) := let x₁ = UB(e₁,Let) in let x₂ = UB(e₂,Let) in
    if max(x₁,x₂) ≤ l then max(x₁,x₂) else
    if x₁ ≥ x₂
    then let x₃ = LBED(e₁,l,Let) in
        max(x₃,LBED(e₂, max(l,x₃),Let))
    else let x₄ = LBED(e₂,l,Let) in
        max(x₄,LBED(e₁, max(l,x₄)Let))
```

Theorem 2 extends also to the ordering version, however the overheads of the sorting version are larger compared to the simple local version.

It is recognized that a potential weakness of the local bounding approaches is that in each dp call it is necessary to calculate a possible answer before use can be made of the bounding approach to prune. Given that bounds in the function that calls dp($\bar{o}$) have already been calculated, use is made of this in the calculation of dp($\bar{o}$). This leads to the argument bounding approach in which an extra argument is added to the dp function, to communicate the previously calculated lower bound. In effect dp($\bar{o}$)=e is simply replaced by dp($\bar{o}$, l)=lbed (e, l, { }).

On the face of it argument bounding could be problematic in that adding a new argument to the dp function extends the number of calls that need to be memoized. However, the present embodiment avoids this by carefully reusing the same memoization for different lower bounds l.

Moreover, argument bounding has other advantages, including making it possible to move the handling of bounds calculations into the start of the dp function, instead of the call sites, leading to cleaner and faster code.

The argument bounded function is created as shown below. The bounding calculations and memoization lookup and storage are folded into the expression.

```
dp(ō,l) = let p = getdp(ō)
    in if optimal(p) then value(p)
        else let u = if known(p) then bound(p) else upperdp(ō)
            in if u ≤ l then u
            else let r = LBED(e,l,{ }) in
                if r > l then setdp(ō,r) else bsetdp(ō,r)
```

The memoized answer is recovered, and if it already records the optimal value this is returned. Otherwise, if a previous upper bound has been recorded it is placed in u. Otherwise the upper bound u is calculated using upperdp. If the upper bound u is no greater than the calling lower bound l the upper bound is simply returned. Otherwise, the body is evaluated using the given bound l and the result is stored in r. If the result r surpasses the lower bound l it is stored as optimal, otherwise it is stored as a bound.

Another change to effect argument bounding is that in the expression lbed(e, l, { }) the definition of lbeddp($\bar{o}$, l') is changed to dp($\bar{o}$, l').

Example 5

The argument bounded version of knapsack is:

```
k(i,w,l) =
    let p = getdp(o)
    in if optimal(p) then value(p)
        else let u = if known(p) then bound(p) else upperk(i,w)
```

In order to create looping versions of $\Sigma$ (similarly for $\Pi$ it is needed to fold functions that pass a pair of (current sum, current lower bound).

The present embodiment again provides for extending the ordering approach to lower bounded evaluation of these loop expressions. Essentially, the upper bounds of e[x] are calculated for each x ∈ o and then the values of o are sorted by this value to give list o'. We then fold over the list o'. For example $$LBED(\text{omax}\{e[x] \mid x \in o\}, l, Let) = \text{let } o' = [\text{snd}(p) \mid p \in \text{sort}([(-UB(e[x]),x) \mid x \in o])] \text{ in foldl}(\lambda y.\lambda x.\max(y, LBED(e[x],y,Let)),l,o')$$

-continued

```
in if u ≤ l then u
    else let r = if i = 0 then 0
        else if w < w_i then k(i - 1,w,l)
            else let x_1 = k(i - 1,w,l) in
                max( x_1,
                    k(i - 1,w - w_i,
                    max(l,x_1) - p_i) + p_i)
    in if r > l then setdp(o,r) else
        bsetdp(o,r)
```

Note that, as opposed to the local transformation, in this example only one lookup of the memo table per function call is required.

One extra requirement of the argument bounded version is that the initial call must have a suitable initial bound. If maximizing, a lower bound is required, this being the opposite bound to the function we require for optimizing transformation. One suitable approach is to use a heuristic solution to the problem to get a good bound.

We straightforwardly combine the argument bounding approach with ordering of sub-expressions using the ordered rewriting for lbed of Section 4.2.

A result analogous to Theorem 2 does not hold for the argument bounding transformation. The body of $dp(\bar{o}, l)$ can be executed multiple times for different values of l if they occur in a decreasing sequence, and are still greater than the actual optimal value. However, the experiment results set out in the following show that in fact any repeated computation for the same value $\bar{o}$ is very rare.

The present embodiment further provides for extending the expression language. Many dynamic programs use some form of set or list comprehension (loops) to define the recursive function. The transformations defined above can be extended to handle expressions of the form:

$$\min\{e[x] \mid x \in o\} \mid \max\{e[x] \mid x \in o\} \mid \Sigma\{e[x] \mid x \in o\} \mid \Pi\{e[x] \mid x \in o\}$$

assuming the set o being looped over does not depend on the dynamic programming function. The only complexity is in describing the looping structure.

For example the lower bounded evaluation of a max set expression can be defined as $$LBED(\max\{e[x] \mid x \in o\}, l, Let) = \text{foldl}(\lambda y.\lambda x.\max(y, LBED(e[x],y,Let)),l,o)$$

The function $\lambda y.\lambda x.\max(y, \text{lbed}(e[x],y,Let))$ takes the current lower bound as first argument y and the value for x and computes the maximum of the lower bounded evaluation of the expression with value x inserted, using y as the lower bound. This creates the new lower bound (and answer to the maximum). This function is folded over the set of values o for x, starting with initial lower bound l.

The values x in o are paired with the negation of their upper bound ub(e[x]), and then sorted, and then the ordered x values are extracted into o'. This is then the order the loop is executed.

Experiments: A prototype optimizing compiler for dynamic program expressions was created in Prolog. It manipulates a term representing the dynamic program to create the term representing the bound optimized version. After transformation, some optimization of the term is performed, removing repeated let definitions, and substituting for let defined variables that occur at most once. Finally the compiler outputs a C procedure for evaluating the dynamic program. The memoization functions and "other code" o used by the dynamic program are assumed to exist already in the C code.

In the experiments conducted the transformer did not fully support the ordering on loop expressions set out previously in relation to extending the expression language. For the one example (Open Stacks) where this ordering on loop expressions is used, the code was added by hand.

These experiments examine 3 problems: 0-1 knapsack, shortest paths and open stacks. The first two are well-studied and there are specific better algorithms than the known dynamic programming approaches, however they serve to illustrate the benefits of the present invention. For the third problem, a dynamic programming solution is the state of the art.

The first experiment examined the knapsack problem discussed previously herein. The upper bounding function is discussed in the introduction. Comparison is made of the knapsack code of the original dynamic program (dp), locally bounded optimization (dpl), locally bounded ordering (ordering the max) (dplo), argument bounded optimization (dpa), argument bounded ordering (dpao), the previously discussed approach of Morin and Marsten (dpm), and an extension thereto (dpme) (R. Carraway and R. Schmidt. An improved discrete dynamic programming algorithm for allocating resources among interdependent projects. *Management Science,* 37(9): 1195-1200, 1991). The generator available at www.diku.dk/~pisinger/gen2.c was used to create knapsack benchmarks with 500 items. 100 examples were created of each of uncorrelated, weakly correlated, strongly correlated, and inverse strongly correlated knapsack problems.

Table 1 shows the average results of each approach in terms of time (milliseconds), number of times the function body was executed (after lookup and pruning), the number of lookups of previous optimal solutions, the number of calls pruned by argument bounds, and the number of resolves (retries), where a call $dp(\bar{o})$ for which the function body has previously executed again executes the function body. Blank columns indicate the count is not applicable. Note that calls—resolves also gives the space required for memoization.

The results in Table 1 clearly show the benefits of the bounded evaluation effected by the present invention. The argument bounding approach is clearly superior to other approaches including dpm and dpme. The use of ordering makes dpao better for all cases except strongly correlated examples. Note dpa and dpao substantially improve on dm and dome.

Two lower bounding functions are used in the experiments. The first simply makes use of connectivity. Let $p_{min}=\Sigma\{d'_i|1\leq i\leq n, d'_i=\min_j d_{ij}, d'_i0\}$ be the shortest possible node distinct path. Note if edge lengths are non-negative then $p_{min}=0$.

A union-find algorithm was applied to all edges incident to $1, \ldots, k$ (in other words all $(i, j)$ where $\{i, j\} \cap \{1, \ldots, k\} \neq \emptyset$

TABLE 1

0-1 Knapsack on 4 classes: uncorrelated, weakly correlated, strongly correlated, inverse strongly correlated

| type | time | count | lookup | prune | retry | type | time | count | lookup | prune | retry |
|---|---|---|---|---|---|---|---|---|---|---|---|
| | | Uncorrelated | | | | | | Strongly correlated | | | |
| dp | 154.60 | 2542848 | 2490438 | | | dp | 309.00 | 7561692 | 2026466 | | |
| dpl | 47.76 | 712591 | 690062 | | | dpl | 10.00 | 162775 | 88842 | | |
| dpo | 66.40 | 712591 | 690062 | | | dpo | 13.96 | 162775 | 88842 | | |
| dpa | 0.08 | 728 | 17 | 704 | 0 | dpa | 3.04 | 47149 | 0 | 30000 | 0 |
| dpao | 0.04 | 716 | 169 | 506 | 0 | dpao | 4.32 | 47597 | 3 | 26447 | 0 |
| dpm | 1.68 | 18568 | 3458 | 15050 | | dpm | 14.28 | 231792 | 121651 | 37439 | |
| dpme | 0.20 | 2663 | 363 | 2300 | | dpme | 10.96 | 139123 | 76941 | 35712 | |
| | | Weakly correlated | | | | | | Inverse strongly correlated | | | |
| dp | 142.84 | 2328037 | 2275126 | | | dp | 169.60 | 2948450 | 2894723 | | |
| dpl | 36.84 | 588732 | 565892 | | | dpl | 75.40 | 1106735 | 1075550 | | |
| dpo | 51.92 | 588732 | 565892 | | | dpo | 105.48 | 1106735 | 1075550 | | |
| dpa | 0.12 | 1000 | 27 | 962 | 0 | dpa | 0.88 | 11392 | 763 | 10590 | 0 |
| dpao | 0.20 | 861 | 129 | 666 | 0 | dpao | 0.84 | 8347 | 81 | 6626 | 0 |
| dpm | 5.44 | 64428 | 15622 | 48733 | | dpm | 4.92 | 68184 | 46401 | 21728 | |
| dpme | 1.56 | 14230 | 2292 | 11938 | | dpme | 2.92 | 34501 | 20309 | 14192 | |

The second experiment addressed the problem of finding shortest (node disjoint) paths in a directed graph with nodes numbered 1 to n, which is another classic dynamic program problem. The function $s(i, j, k)$ returns the length of the shortest (node disjoint) path from node i to node j using at most $1, \ldots, k$ as intermediate nodes. The recursive function is defined as follows.

$$s(i,j,k) = \text{if } i = j \text{ then } 0$$
$$\text{else if } k = 0 \text{ then } d_{ij}$$
$$\text{else } \min(s(i,j,k-1), s(i,k,k-1) + s(k,j,k-1))$$

where $d_{ij}$ is the (directed) edge length from i to j.

and $d_{ij} < +\infty$) to define a representative $r(i, k)$ for each node i of the connected cluster it belongs to. If two nodes i and j have different representatives $r(i, k)$ and $r(j, k)$ then they cannot be connected through $1, \ldots, k$ and only the direct arc is possible. Otherwise we use $p_{min}$ as the bound.

$$ls(i, j, k) = \text{if } r(i, k) \neq r(j, k) \text{ then } d_{ij} \text{ else } p_{min}$$

If each node i represents a position $(x_i, y_i)$ in 2D space and the edge lengths $d_{ij}$ are guaranteed to be greater than or equal to the Euclidean distance $\sqrt{(x_i-x_j)^2+(y_i-y_j)^2}$, then we can improve the above bound by replacing $p_{min}$ by the Euclidean distance $\sqrt{(x_i-x_j)^2+(y_i-y_j)^2}$.

TABLE 2

USA-road-d.NY non-Euclidean bounds on the left, Euclidean bounds on the right

| type | time | count | lookup | prune | retry | type | time | count | lookup | prune | retry |
|---|---|---|---|---|---|---|---|---|---|---|---|
| dp | 6590.12 | 41726638 | 82703503 | | | dp | 6963.84 | 41726638 | 82703503 | | |
| dpl | 205.77 | 978535 | 4584 | | | dpl | 61.58 | 272404 | 1038 | | |
| dpo | 109.95 | 376304 | 4608 | | | dpo | 38.42 | 119714 | 1052 | | |
| dpa | 101.58 | 395346 | 43899 | 735172 | 4938 | dpa | 51.93 | 215811 | 29995 | 398375 | 191 |
| dpao | 59.16 | 198962 | 14268 | 374486 | 0 | dpao | 7.26 | 19427 | 364 | 37690 | 0 |
| dp | 6720.35 | 41748030 | 82746060 | | | dp | 6755.91 | 41748030 | 82746060 | | |
| dpl | 364.30 | 1692531 | 9980 | | | dpl | 167.94 | 751044 | 3686 | | |
| dpo | 173.81 | 589276 | 10029 | | | dpo | 99.19 | 313666 | 3751 | | |
| dpa | 117.48 | 469791 | 93281 | 827654 | 15611 | dpa | 62.19 | 256666 | 60248 | 448779 | 473 |
| dpao | 69.93 | 242022 | 33742 | 434612 | 0 | dpao | 11.04 | 28897 | 709 | 55737 | 0 |
| dp | 6603.70 | 41265211 | 81789087 | | | dp | 6856.39 | 41265211 | 81789087 | | |
| dpl | 290.22 | 1383633 | 8445 | | | dpl | 126.65 | 573112 | 2960 | | |
| dpo | 100.70 | 341407 | 8461 | | | dpo | 55.78 | 169317 | 2973 | | |
| dpa | 127.85 | 505092 | 64475 | 930808 | 9404 | dpa | 71.45 | 288697 | 41169 | 531596 | 747 |
| dpao | 74.98 | 255488 | 24127 | 475364 | 0 | dpao | 14.68 | 39093 | 822 | 76152 | 0 |

The same set of procedures was compared as for knapsack, except for dpm and dpme which are not applicable. The ordering is on the min. The instances used for evaluating this approach were derived from instances of the 9th DIMACS Implementation Challenge—Shortest Paths (www.dis.uniroma1.it/challenge9/). Three 500 node slices of the New York City dataset were used, with up to 100 feasible shortest path queries per instance. The datasets were solved both without and with the Euclidian distance bounds.

The results are shown in Table 2. For dpa and dpao a heuristic upper bound greater than the sum of maximum arc lengths was used. For these examples the difference between local and argument bounding is less than previously, and the advantage of ordering is clear. This example also illustrates how a more accurate bounding function (Euclidean) can substantially improve the results.

The third experiment was conducted on open stacks. The minimization of maximum number of open stacks problem is defined as follows: Given a set of products P for each product $p \in P$ there is a set of customers wanting the product $c(p)$. A stack is open for a customer c from the time the first product p is created where $c \in c(p)$, to the time the last product p is created with $c \in c(p)$. The aim is to order the set of products to minimize the maximum number of open stacks. Then $a(p',S) = |\cup_{p \in S \cup \{p'\}} c(p)) \cap (\cup_{p \in P-S} c(p))|$ is the number of stacks open when scheduling p' after $P-S-\{p'\}$ and before S. The recursive function definition o(S) which gives the number of open stacks for scheduling S assuming P–S where scheduled previously is:

$$o(S) = \text{if } S = \{ \} \text{ then } 0$$
$$\text{else } \min\{\max(a(p, S - \{p\}), o(S - \{p\})) \mid p \in S\}$$

The lower bounding function used is set out in M. Garcia de la Banda and P. J Stuckey. Dynamic programming to minimize the maximum number of open stacks. *INFORMS Journal of Computing*.

Experimental comparison is made of a number of the more difficult small benchmarks from the Constraint Modelling Challenge 2005, namely 20 products, 20 customers, each a suite of 100 instances. We compare the same set of codes as in knapsack, as well as the dynamic programming solution to this problem that won the Constraint Modelling Challenge 2005, beating other solutions by at least two orders of magnitude (dpc).

The results are shown in Table 3. For dpa, dpao, dpm, dpme and dpc the best heuristic upper bound of 6 heuristics was used. For these examples this is almost always the optimal answer for these benchmarks. Hence dpm is very similar to dpa in performance. dpme is slower because it needs to find many heuristic solutions for the sub-problems. If a weaker upper bound is used dpa, dpme and dpc are almost unchanged, but dpm performs uniformly worse than dpl. Ordering is distinctly worse for this example, because so many solutions are equivalent in terms of objective, and it forces more to be explored. Note that dpa is only around 4 times slower and never requires more than 25% more space than the best known solution dpc which incorporates many other kinds of optimizations, as well its own special bounding approach, illustrating the value of the present approach derived directly from the naive recursive equation.

By allowing automatic bounding of dynamic programs the present invention allows programmers to gain the advantages of bounding without the complexity of manual implementation. Of the approaches investigated argument bounding with or without ordering is best, and even though it is not guaranteed to resolve the same problem, clearly this happens only rarely. It is notable that other embodiments of the present invention may provide for extending the approach to a greater class of expressions (negation, subtraction, multiplication by non-positive numbers) if there is also a separate lower bounding function. Other optimizations/transformations could also be included, such as: checking whether the optimal answer $dp(\overline{o})$ has already been computed before worrying about bounding; and optimistically improving bounds in the hope of finding good solutions faster.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

TABLE 3

Openstacks: problem_20_20, wbo_20_20, wbop_20_20, wbp_20_20

| type | time | call | look | prune | retry | type | time | call | look | prune | retry |
|---|---|---|---|---|---|---|---|---|---|---|---|
| | problem_20_20 | | | | | | wbop_20_20 | | | | |
| dp | 1359.49 | 483773 | 4186989 | | | dp | 3237.96 | 1048595 | 9437166 | | |
| dpl | 59.18 | 21920 | 18167 | | | dpl | 184.36 | 61233 | 54879 | | |
| dpo | 101.16 | 14179 | 5697 | | | dpo | 269.02 | 32260 | 13238 | | |
| dpa | 10.82 | 3145 | 5 | 12659 | 0 | dpa | 16.40 | 4156 | 8 | 14516 | 0 |
| dpao | 109.00 | 15241 | 26636 | 16916 | 972 | dpao | 285.82 | 34386 | 49194 | 31554 | 1948 |
| dpm | 11.02 | 2869 | 11881 | 23948 | | dpm | 20.84 | 4698 | 17642 | 47747 | |
| dpme | 148.04 | 2781 | 11563 | 23354 | | dpme | 204.53 | 3760 | 13501 | 40049 | |
| dpc | 2.87 | 1970 | 2816 | | | dpc | 5.02 | 3465 | 6464 | | |
| | wbo_20_20 | | | | | | wbp_20_20 | | | | |
| dp | 3074.13 | 1003447 | 9014094 | | | dp | 1342.36 | 471523 | 4097099 | | |
| dpl | 195.87 | 66439 | 58442 | | | dpl | 91.29 | 33323 | 27930 | | |
| dpo | 293.29 | 36113 | 14139 | | | dpo | 157.60 | 21489 | 8938 | | |
| dpa | 18.27 | 4735 | 9 | 16987 | 0 | dpa | 13.64 | 4012 | 8 | 15566 | 0 |
| dpao | 313.56 | 38642 | 57453 | 33913 | 2237 | dpao | 169.20 | 23059 | 40236 | 26884 | 1462 |
| dpm | 20.53 | 4973 | 18526 | 49729 | | dpm | 16.62 | 4584 | 18745 | 38453 | |
| dpme | 241.87 | 4353 | 16190 | 44697 | | dpme | 183.60 | 3451 | 13647 | 31248 | |
| dpc | 4.58 | 3284 | 4672 | | | dpc | 4.36 | 3009 | 5147 | | |

The invention claimed is:

1. A method of solving a combinatorial optimization problem using dynamic programming, the method comprising:

automating integration of bounds propagation into compilation of a dynamic program, by extracting bounds from partial results obtained during dynamic programming, and tightening the bounds throughout execution of the dynamic program.

2. The method of claim 1, wherein local bounding is applied to give a local lower bound in calculating remaining alternatives to the dynamic program.

3. The method of claim 2, wherein ordering is provided, in which upper bounds are used to order sub-problems based on a likelihood of finding good solutions first, to improve pruning efficacy.

4. The method of claim 1 wherein argument bounding is provided, in which lower bounds are calculated and passed to sub-problems and upper bounds are used to prune useless sub-problems.

5. The method of claim 4 further comprising reusing memorization for different lower bounds to avoid extending the number of calls to be made.

6. The method of claim 4 further comprising moving bounds calculations into the start of the dynamic program function to improve speed.

7. A non-transitory machine readable medium that provides instructions for compiling a dynamic program for solving a combinatorial optimization problem, which when executed by a machine, cause the machine to perform operations, comprising:

automating integration of bounds propagation into compilation of a dynamic program, by extracting bounds from partial results obtained during dynamic programming, and tightening the bounds throughout execution of the dynamic program.

8. The non-transitory machine readable medium of claim 7 further comprising instructions for applying local bounding, to give a local lower bound in calculating remaining alternatives to the dynamic program.

9. The non-transitory machine readable medium of claim 8 further comprising instructions for providing ordering, in which upper bounds are used to order sub-problems based on a likelihood of finding good solutions first, to improve pruning efficacy.

10. The non-transitory machine readable medium of claim 7 further comprising instructions for argument bounding, in which lower bounds are calculated and passed to sub-problems and upper bounds are used to prune useless sub-problems.

11. The non-transitory machine readable medium of claim 10 further comprising instructions for reusing memorization for different lower bounds, to avoid extending the number of calls to be made.

12. The non-transitory machine readable medium of claim 10 further comprising instructions for moving bounds calculations into the start of the dynamic program function to improve speed.

13. A computing device operating under control of instructions on a non-transitory machine-readable medium in accordance with claim 7.

* * * * *